March 11, 1952 J. M. WALTER 2,588,676
LUBRICANT PUMP FOR MACHINE TOOLS
Filed Sept. 29, 1948 2 SHEETS—SHEET 1

INVENTOR.
JOHN M. WALTER.
BY
ATTORNEYS.

March 11, 1952 J. M. WALTER 2,588,676
LUBRICANT PUMP FOR MACHINE TOOLS
Filed Sept. 29, 1948 2 SHEETS—SHEET 2

INVENTOR.
JOHN M. WALTER,
BY
ATTORNEYS.

Patented Mar. 11, 1952

2,588,676

UNITED STATES PATENT OFFICE 2,588,676

LUBRICANT PUMP FOR MACHINE TOOLS

John M. Walter, Cincinnati, Ohio, assignor to The G. A. Gray Company, Cincinnati, Ohio, a corporation of Ohio Application September 29, 1948, Serial No. 51,736

4 Claims. (Cl. 184—6)

This invention relates to a lubricant pump for machine tools, but it is not a substitute for lubricant pumps at present in use in connection with machine tools. The pump of the present invention is an auxiliary pump for a specific purpose, which will be pointed out hereinafter.

In many machine tools, and particularly large machine tools such as planers, wherein one member is movable along ways on another member, trouble has been had with wear and scoring of the ways, because of the tremendous weight of the moving part. The ways in such machine tools are generally lubricated in conventional manner, but it does not appear to be sufficient to prevent the excessive wear and scoring mentioned above.

It is therefore an object of my invention to provide for a supplementary flow of lubricant under pressure to the ways incident to the starting movement of the one member upon the other. It is another object of my invention to provide a pump and means to cause said pump to operate automatically incident to the actuation of means to move the one member upon the other.

It is yet another object of my invention to provide a solenoid operated pump of the piston type wherein the solenoid produces in the pump a suction stroke, and to provide biasing means in a pumping direction, together with means to release said solenoid for a pumping stroke.

This and other objects of my invention which I shall point out in more detail hereinafter, or which will be apparent to one skilled in the art upon studying these specifications, I accomplish by that certain construction and arrangement of parts of which I shall now describe an exemplary embodiment.

Reference is made to the drawings forming a part hereof and in which.

Figure 5:
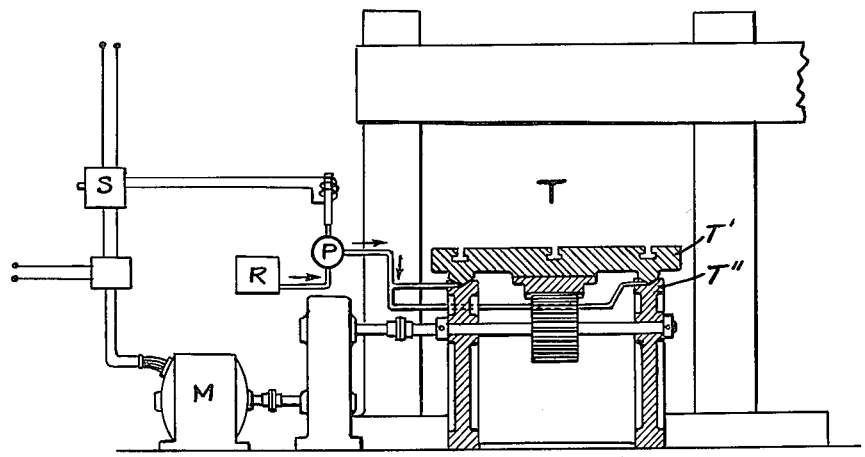
Figure 5 is a diagrammatic representation of a machine tool, showing an application of the present invention.

Briefly, in the practice of my invention I provide a piston pump P (Figure 5) connected to a reservoir R from which it may draw lubricant and having a line leading to the ways between two relatively movable members T', T'' of the machine tool T. The invention is applicable to lubrication of the ways between the head and column, between the column and the base, and all similar situations. The pump is biased by means of a spring in a pumping direction, and has a piston rod with a hook-like configuration at its end. A solenoid having a plunger with a hook-like element is arranged to pull the pump piston against the spring in a suction stroke, and means are provided after the pump piston has moved a limited distance to disengage from each other the above mentioned hook elements whereby the spring returns the pump piston in a pumping stroke.

Figures 1, 2, 3, 4:
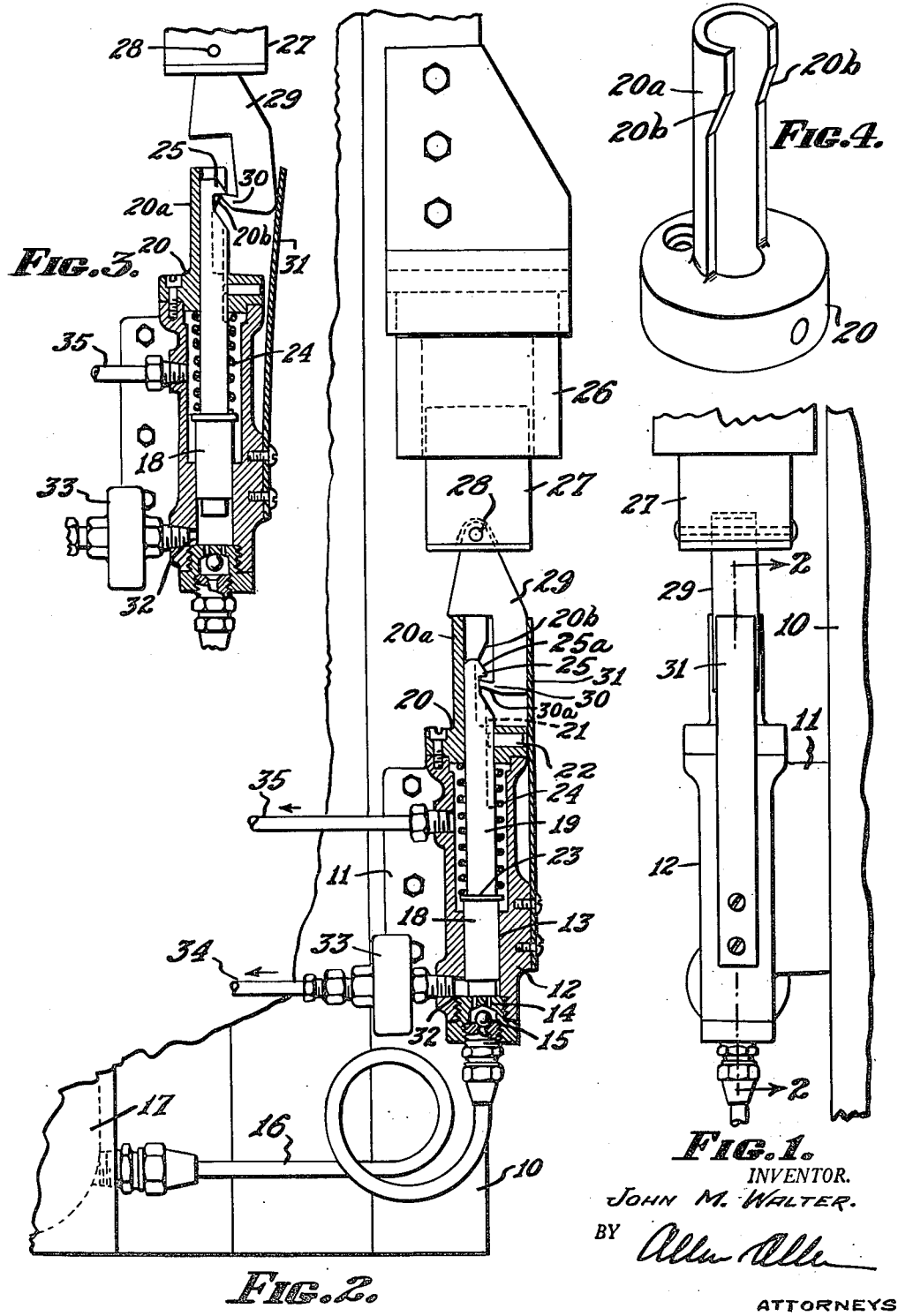
Figure 1 is an elevational view of a solenoid and pump according to my invention.
Figure 2 is a cross-sectional view of the same taken on the line 2—2 of Figure 1.
Figure 3 is a view similar to Figure 2, but showing the pump at a different stage of operation.
Figure 4 is a perspective view of the pump piston rod guide.

Referring more in detail to the figures, 10 indicates a portion of a machine tool which since it forms no part of the present invention need not be illustrated further. Suitably secured to the member 10 by means of a bracket 11 is the pump casing 12. The casing is provided with a cylinder 13 and entrance ports 14 controlled by a ball check valve or the like 15. The entrance ports are connected by means of a line 16 to a reservoir 17. Within the pump cylinder 13 operates the piston 18, which is provided with the elongated rod 19. The rod 19 passes through a gate member 20 and is provided with a keyway slot 21, a pin 22 extends into the slot 21 from the member 20 so as to permit longitudinal movement of the piston rod 19 while preventing the rotation thereof. The piston is provided with a flange, or shoulder, 23 and a compression spring 24 is provided bearing at one end against the shoulder 23 and at its other end against the under side of the member 20. This compression spring tends to urge the piston 18 downward as seen in Figure 2.

The upper end of the piston rod 19 is formed with the hook-like configuration 25, and the sleeve portion 20a of the member 20 acts as a guide for the piston rod 19. The sleeve 20a is cut away on one side and is provided with the cam surfaces 20b.

A solenoid is indicated generally at 26 having a plunger 27 to which is pivoted as at 28 an element 29 terminating in the hook-like portion 30. A leaf spring 31 bears against the member 29, tending to urge it toward the left in Figure 2.

At the lower end of the cylinder 13 an outlet port 32 is provided which leads through a suitable oil filter 33 to the line 34, which communicates with the ways to be lubricated. At 35 there is indicated a drain-back line which may lead back to the reservoir 17.

In order that a shot of oil under pressure be provided incident to the starting of the movement along the ways, the solenoid 26 is arranged to be energized by the same button or switch S (Figure 5) which is used to initiate operation of the motor M which causes the member T' to move on the ways T''. Thus, in operation, when the operator presses the button, or throws a switch, to initiate movement say of the column, table, or the like on its ways, solenoid 26 is instantaneously actuated. As it moves upward (the hook-like members 25 and 30 being engaged as shown in Figure 2) the piston 18 is drawn upwardly drawing the oil or other suitable lubricant from the reservoir 17 through the line 16 past the check valve 15, and through the ports 14.

Referring now to Figure 3, as the solenoid continues to draw up the hook element 30 and the member 29 (which is broad enough to span the distance between the cam surfaces 20b) rides up the cam surfaces 20b as shown in Figure 3 until the hook members 30 and 25 become disengaged, whereupon the compression of the spring 24 forces the piston 18 downwardly, pumping a charge of oil through the port 32, filter 33 and the line 34 to the ways to be lubricated.

As soon as the solenoid is de-energized and its plunger moves downwardly as shown in the figures, engagement of the cam surfaces 30a and 25a, causes the member 29 to swing toward the right against the leaf spring 31 until the hook elements 25 and 30 have passed each other, whereupon the spring 31 returns the parts to the position of Figure 2.

It will thus be seen that I have provided an arrangement whereby a volume of oil under pressure is delivered to the ways between two machine tool parts incident to the initiation of movement therebetween. This lubrication is in addition to and supplementary to the normal lubrication of the machine, and I have found that it greatly reduces scoring and wear of the ways, and thus prolongs the life of the machine tool.

It will be clear that numerous modifications may be made in my invention without departing from the spirit thereof. I, therefore, do not intend to limit myself except as set forth in the claims which follow.

Having now fully described my invention, what I claim as new and desire to secure by Letters Patent is:

1. In combination with a machine tool having a member movable along ways and having a switch for initiating movement of said member, said machine tool having a lubricant reservoir, a piston pump having a piston rod terminating in a hook element, a solenoid having a plunger terminating in a hook element adapted to engage the hook element on said piston rod, said solenoid being arranged for energization upon actuation of said switch, means biasing said piston rod in opposition to the action of said solenoid, and means for producing disengagement of said hooks upon a predetermined amount of travel of said plunger, said pump being arranged to receive lubricant from said reservoir, and to deliver it between said member and said ways.

2. In combination with a machine tool having a member movable along ways and having a switch for initiating movement of the said member, said machine tool having a lubricant reservoir, a piston pump having a piston rod terminating in a hook element, a guide for said rod, said guide having a cam surface, a solenoid having a plunger, a hook element pivotally secured to said plunger and adapted to engage the hook element on said piston rod, said pivoted hook element being arranged to encounter said cam surface after a predetermined length of movement of said plunger, means biasing said piston rod in opposition to the action of said solenoid, said solenoid being arranged to be energized upon actuation of said switch, and said pump being arranged to receive lubricant from said reservoir and to deliver it between said member and said ways, whereby upon actuation of said switch said solenoid plunger moves said piston rod until said cam surface causes disengagement of said hook members, whereupon said biasing means returns said piston rod to its starting position.

3. In combination with a machine tool having a member movable along ways and having a switch for initiating movement of said member, said machine tool having a lubricant reservoir, a piston pump having a piston rod, means biasing said rod in the discharging direction, a solenoid for engaging said rod for moving it in the charging direction, said solenoid being arranged for energization upon actuation of said switch, and means for disconnecting said rod from said solenoid after a predetermined amount of movement of said rod, said pump being arranged to receive lubricant from said reservoir, and to deliver it between said member and said ways.

4. In combination with a machine tool having a member movable along ways and having a switch for initiating movement of said member, said machine tool having a lubricant reservoir, a piston pump having a piston rod, a solenoid having a plunger and arranged for energization upon actuation of said switch, means biasing said piston rod in opposition to the action of said solenoid, releasable connecting means for transmitting the movement of said plunger to said piston rod, and means for releasing said connecting means after a predetermined amount of travel of said plunger, said pump being arranged to receive lubricant from said reservoir and to deliver it between said member and said ways.

JOHN M. WALTER.

REFERENCES CITED

The following references are of record in the file of this patent:

UNITED STATES PATENTS

| Number | Name | Date |
|---|---|---|
| 1,162,794 | Magnuson | Dec. 7, 1915 |
| 1,296,744 | Blood | Mar. 11, 1919 |
| 1,669,504 | Baker | May 15, 1928 |
| 1,797,547 | Class | Mar. 24, 1931 |
| 1,872,279 | Hallett | Aug. 16, 1932 |
| 1,987,256 | Johnson | Jan. 8, 1935 |
| 2,225,539 | Persson | Dec. 17, 1940 |

FOREIGN PATENTS

| Number | Country | Date |
|---|---|---|
| 101,019 | Switzerland | Sept. 1, 1923 |